Jan. 31, 1950 M. T. CAHENZLI, JR 2,496,149
COUPLER
Filed July 26, 1946
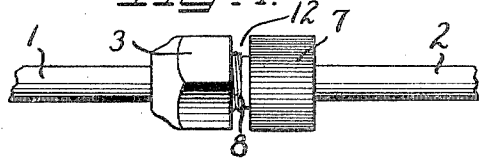
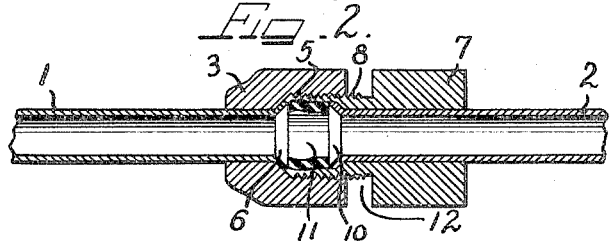
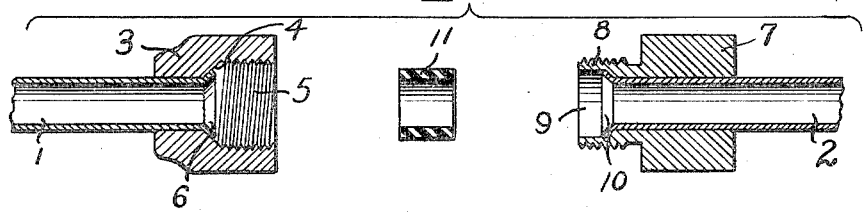
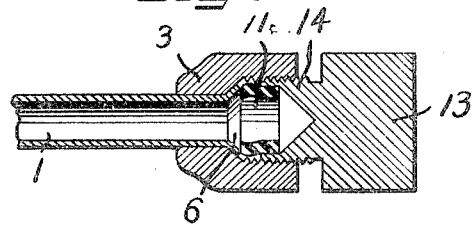
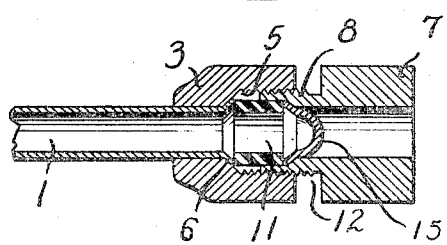
INVENTOR.
MARTIN T. CAHENZLI JR
BY
ATTYS Patented Jan. 31, 1950

2,496,149

UNITED STATES PATENT OFFICE 2,496,149

COUPLER

Martin T. Cahenzli, Jr., Chicago, Ill., assignor to The Harry Alter Company, Chicago, Ill., a corporation of Illinois Application July 26, 1946, Serial No. 686,555

4 Claims. (Cl. 285—126)

This invention relates to improvements in a coupler, and more particularly to a coupling assembly or arrangement highly desirable for connecting adjacent ends of fluid lines, although the invention may have other uses and purposes as will be apparent to one skilled in the art.

In the past, many and various types of couplers have been designed for joining the component parts of a fluid line or system but have proven objectionable for various reasons. In many instances, the assemblies included wearing parts which could not be repaired or replaced and which, when worn, rendered the entire coupling assembly useless. In other cases, the assemblies comprised too many parts, were too difficult to effect the desired connection, required the use of tools in order to secure a fluid tight connection, were limited in their use and required special parts to effect their repair or replacement. In other words, the couplings were not adaptable to perform several different functions with the use of material at hand when repairs or adjustments were being made upon a job. This was particularly true in connection with refrigerant lines, wherein it is extremely difficult to find room to manipulate couplings heretofore known, difficult to use tools, and where it is frequently ascertained that a new part is necessary after the fluid line has been opened, and if a particular or special part is not available, there is a delay that may cause considerable damage and expense.

With the foregoing in mind, it is an important object of the instant invention to provide a coupling arrangement that embodies an absolute minimum of parts.

Another object of the invention is the provision of a coupling arrangement comprising only a pair of fittings and a gasket, each one of the fittings being associated with a component part of a fluid line.

It is a further object of this invention to provide a coupling assembly in which all parts of the coupling assembly are free for movement relatively to both component parts of the fluid line, and thus freedom of movement is only reduced or eliminated when the parts of the coupling are tightly connected.

It is also an object of this invention to provide a coupling assembly exceedingly simple in construction, and which may be connected in a fluid tight manner or disconnected without the use of any tools.

It is also a feature of this invention to provide a coupling arrangement for component parts of a fluid line which coupling arrangement may be disconnected and a part of it turned into a plug with the use of material at hand or customarily carried by an operator on such work.

Still another feature of the invention resides in the provision of a coupling arrangement extremely economical to manufacture and use and in which the only part subject to wear is an oversize gasket which may be worn considerably and throughout an indefinite period of time before it need be replaced.

Still a further object of the instant invention is the provision of a coupling assembly of such character that a female fitting of the type customarily used on the ends of coils and similar parts of a fluid line may be incorporated as a component part of the coupling assembly.

While some of the more salient features, characteristics and advantages of the instant invention have been above pointed out, others will become apparent from the following disclosures, taken in conjunction with the accompanying drawing, in which:

Figure 1 is a fragmentary elevational view illustrating a coupling arrangement embodying principles of the instant invention in connected position joining component parts of a fluid line;

Figure 2 is an enlarged fragmentary central vertical sectional view through the structure of Fig. 1;

Figure 3 is a fragmentary vertical sectional view showing the structure of Fig. 2 exploded with the component parts of the coupling arrangement in separated position;

Figure 4 is a central vertical sectional view illustrating how the coupling arrangement may be utilized with available material to plug one end of the fluid line; and Figure 5 is a fragmentary vertical sectional view illustrating another manner of effecting a plug in one end of a fluid line with the coupling means.

As shown on the drawings:

In the illustrated embodiment of the instant invention there is shown a coupling arrangement associated with component parts of a fluid line including a conduit 1 and a conduit 2. These conduits may be rigid in character, or they may be of the bendable type made of copper or some similar soft metal so that the shaping of the fluid line itself may be changed at will merely by bending the line with the hand, as is commonly done in connection with refrigerant lines.

Associated with the end of the conduit 1 is a female fitting 3 which may be provided with an external polygonal configuration as seen in Fig. 1 to facilitate its movement by the hands of an operator. This fitting 3 is hollow and is provided with a smooth bore in one end through which the end of a conduit 1 extends, and this bore is then enlarged obliquely as indicated at 4 in Fig. 3 to merge into an internally threaded bore 5 of larger diameter. The oblique junction between the differently sized bores effectively accommodates the flange or flared end 6 of the tube 1. It should be noted that the fitting 3 is loose upon the tube or conduit 1 so that it may rotate relatively to the conduit or slide along the conduit. In the event the flared end 6 becomes weakened for any reason, it is a simple expedient to slide the fitting down along the tube, cut off the injured or worn tube end, and provide it with a new flare with a simple flaring tool commonly carried by fluid line repair men. The fitting may then again be moved to the position seen in Figs. 2 and 3 for operative engagement with another fitting to be later described.

Associated with the end of the tube or conduit 2 is a male fitting 7. The outside of this fitting may be polygonal in shape, or may be knurled or equivalently treated as indicated in Fig. 1 so that the hands of an operator may effectively grip it. This male fitting 7 is provided with a fluid bore of a size to freely accommodate the end of the tube or conduit 2. This fluid bore extends partially through an externally threaded projecting portion 8 which is of a size for engagement in the internally threaded portion 5 of the female fitting 3. The outermost portion of the projection 8 is provided with a smooth internal bore 9 of greater diameter than the tube accommodating bore, and the juncture between the two bores is again oblique to accommodate the flared end 10 of the tube or conduit 2.

The bore 9 in the male fitting 7 functions as a socket or seat for a gasket 11. As illustrated, this gasket is cylindrical in shape and is of a length greater than the depth of the socket or seat 9 so that when the gasket is positioned in the socket 9 a goodly portion of the gasket projects therewithout as is clearly evident from the showing in Figs. 2 and 5. The gasket is, of course, hollow so that it functions as an integral part of the fluid line after the parts of the coupling are connected, and may be made of rubber, synthetic rubber, or any other suitable but preferably resilient material.

When it is desired to couple the component parts of the fluid line together, it is a simple expedient to threadedly engage the projecting part 8 of the male fitting 7 in the internally threaded part 5 of the female fitting 3. During this engagement, the male fitting carries a gasket 11 therein. Both fittings may be turned or rotated relatively to the respective conduits with which each is associated so that the coupling may be established with great rapidity by even a clumsy operator. It is only necessary for the threaded engagement to be established by manipulating the fittings 3 and 7 with the hands. No tools are needed to establish a fluid tight connection. From the showing in Fig. 2, it will be noted that when the parts are connected, the gasket is compressed to some extent and is in abutment with the flared ends 6 and 10 on the conduits 1 and 2 respectively so that the gasket forces the flared ends firmly in their seats in the respective fittings. Thus, the seal is effectively established by the gasket, and it is not until a tight and firm connection is established that the movement of either fitting relatively to its conduit is terminated. It should also be noted that when the fittings are joined together there is preferably a space 12 between the body portions of the fitting, especially when the coupling arrangement is new. In the event the gasket wears after repeated connections and disconnections of the coupling, the space 12 provides room for takeup so that the gasket is still effective, even though reduced in length, to effect a fluid tight seal. Thus, the entire coupling arrangement is extremely long lived and the gasket need not be replaced for a considerable length of time which is dependent to some extent upon the frequency with which connections and disconnections are made. It is further apparent that the entire coupling assembly occupies very little space and this feature, plus the ease with which the coupling may be manipulated, renders the assembly highly desirable for use in refrigerant systems.

In Fig. 4 I have illustrated how one side of the fluid line may be blocked when desired. Assuming that the component parts of the line have been separated by disconnecting the coupling fittings 3 and 7, it is a simple expedient to substitute a male plug 13 having an externally threaded projecting portion 14 for the fitting 7. This plug is provided with a similar gasket seat for said fitting 7, but there is no passage through the plug. Therefore, when the plug is engaged with the female fitting 3 in the same manner as the fitting 7, the conduit 1 is effectively blocked and sealed. In similar manner, a female plug may be substituted for the female fitting 3, associated with the male fitting 7 carrying the gasket, and the conduit 2 is effectively blocked.

In the event an operator does not have a plug with him at the time, it is also a simple expedient to block one part of the line with the use of a bonnet 15, as illustrated in Fig. 5. An operator working upon fluid line servicing will seldom if ever be without a bonnet. It is a simple expedient then to insert the bonnet in position behind the gasket in the fitting 7 which will then have been removed from the conduit 2, and use the coupling arrangement in exactly the manner as above described. In this instance, however, the gasket 11 will abut the flared end of the bonnet 15 and force it firmly into position, and the other end of the gasket will bear against the flared end of the conduit 1, and the line 1 is blocked. In similar manner the bonnet may be associated with the fitting 3 to block the line 2 when desired.

If for any reason it should happen that a gasket is objectionably worn, or defective in some way, and a new gasket was not available, it would be a simple expedient to clip off a section of rubber tubing or the equivalent and substitute it for a gasket, thus still effecting a fluid tight seal, and a new gasket could later be substituted for the tube section if so desired.

From the foregoing, it is apparent that I have provided an extremely economically and easily manipulatable coupling arrangement, requiring the use of no tools whatever to effect a fluid tight seal, an arrangement that takes up a minimum amount of space, and an arrangement in which the only wearable parts may readily be replaced without the necessity of requiring a special replacement piece. It will also be noted that either part of the coupling may be used to effect a block of a portion of the fluid line with the aid of material readily available to a service man.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a coupling arrangement, a female fitting, a male fitting, one of said fittings having a socket for the reception of a cylindrical gasket, and a gasket in said socket, each of said fittings having an internal bore obliquely expanded to seat the flared end of a conduit, said gasket receiving socket being entirely inward of the respective conduit seat and said gasket abutting both such flared ends when the fittings are connected.

2. In a coupling arrangement, a female fitting having a smooth bore for a conduit end and an enlarged internally threaded bore for a male fitting, a male fitting having a smooth bore for a conduit end and an enlarged bore for a cylindrical gasket, the part around said gasket bore being externally threaded for engagement with said female fitting, and a gasket seated in said male fitting and projecting axially therebeyond to extend into the female fitting when the fittings are connected, the connections between the respective bores in each fitting being oblique so each fitting will accommodate a flared conduit end, and said gasket being sized to abut such flared conduit ends when the fittings are connected.

3. In combination, a pair of fluid conduits each having anchoring means on the end, a female fitting loosely engaged on the end of one conduit, a male fitting loosely engaged on the end of the other conduit, one of said fittings having a gasket socket therein, a gasket in the form of a true hollow cylinder in said socket and of a greater length than said socket to abut the ends of said conduits and effect a seal when said fittings are connected.

4. In a coupling arrangement, a female fitting, a male fitting, each of said fittings having a smooth bore therethrough terminating at the inner end in an oblique bore to receive a flared end of articles to be held in position by the coupling arrangement, one of said fittings having a straight smooth bore of greater diameter and inwardly of said oblique bore to receive a gasket, and a hollow truly cylindrical gasket in the last said bore positioned to have its ends abut the flared ends on the articles connected by the coupling arrangement.

MARTIN T. CAHENZLI, Jr.

REFERENCES CITED

The following references are of record in the file of this patent:

UNITED STATES PATENTS

| Number | Name | Date |
|---|---|---|
| 1,699,277 | Bronson | Jan. 15, 1929 |
| 2,287,142 | Simmonds | June 23, 1942 |
| 2,374,138 | Sanford | Apr. 17, 1945 |
| 2,420,778 | Herold | May 20, 1947 |